(12) United States Patent
Taguchi (10) Patent No.: US 7,065,786 B2
(45) Date of Patent: Jun. 20, 2006

(54) PASSWORD GENERATION AND VERIFICATION SYSTEM AND METHOD THEREFOR

(76) Inventor: Akira Taguchi, #201 Hatsunegaoka 5-12 Hodogaya-ku, Yokohama (JP) 240-0016

( * ) Notice: Subject to any disclaimer, the term of this patent is extended or adjusted under 35 U.S.C. 154(b) by 687 days.

(21) Appl. No.: 09/909,383

(22) Filed: Jul. 19, 2001

(65) Prior Publication Data

US 2002/0083347 A1    Jun. 27, 2002

(30) Foreign Application Priority Data

Dec. 25, 2000    (JP) .............................. 2000-391720

(51) Int. Cl.
*G06F 7/04* (2006.01)
*G06F 7/58* (2006.01)
*G06F 12/00* (2006.01)
*G06F 12/14* (2006.01)
*G06F 13/00* (2006.01)

(52) U.S. Cl. ................... 726/18; 726/2; 726/4; 726/19; 726/28; 726/29; 726/30; 379/70; 379/88; 340/825

(58) Field of Classification Search ........ 713/200–202; 379/88, 70; 340/825; 235/382; 726/2, 4, 726/19, 28–30
See application file for complete search history.

(56) References Cited

U.S. PATENT DOCUMENTS

| 4,528,442 | A  | * | 7/1985 | Endo ........................... 235/379 |
| 5,442,342 | A  | * | 8/1995 | Kung ......................... 340/5.27 |
| 5,719,560 | A  | * | 2/1998 | Watkins ....................... 340/5.5 |
| 6,263,439 | B1 | * | 7/2001 | Hondros et al. ............. 713/182 |
| 6,263,447 | B1 | * | 7/2001 | French et al. ............... 713/201 |
| 6,542,583 | B1 | * | 4/2003 | Taylor ..................... 379/88.02 |
| 2006/0010487 | A1 | * | 1/2006 | Fierer et al. ................... 726/5 |

* cited by examiner

*Primary Examiner*—Ayaz Sheikh
*Assistant Examiner*—Shin-Hon Chen
(74) *Attorney, Agent, or Firm*—Parsons & Goltry; Robert A. Parsons; Michael W. Goltry (57) ABSTRACT

A system and method for facilitating password control and maintenance is provided. A system 10 is provided where a plurality of categories are set so that a single piece or multiple pieces of information that are familiar to the user can be set as a password element(s) for each category. Each sampled password element that is grouped according to each category that is randomly sampled from said categories is displayed, in random order, together with a plurality of scramble elements, on a display device 17. Of those displayed, the user chooses selected password elements that are familiar to him. If all of the selected password elements match the preset sampled password elements, authentication is issued to the user.

9 Claims, 8 Drawing Sheets

| CATEGORY NO. | SERIAL NO. | SCRAMBLE ELEMENT | | | | | | | |
|---|---|---|---|---|---|---|---|---|---|
| 1 | 1 | SE11 | 2 | 1 | SE21 | 3 | 1 | SE31 | ... |
| 1 | 2 | SE12 | 2 | 2 | SE22 | 3 | 2 | SE32 | ... |
| 1 | 3 | SE13 | 2 | 3 | SE23 | 3 | 3 | SE33 | ... |
| 1 | 4 | SE14 | 2 | 4 | SE24 | 3 | 4 | SE34 | ... |
| 1 | 5 | SE15 | 2 | 5 | SE25 | 3 | 5 | SE35 | ... |
| 1 | 6 | SE16 | 2 | 6 | SE26 | 3 | 6 | SE36 | ... |
| 1 | 7 | SE17 | 2 | 7 | SE27 | 3 | 7 | SE37 | ... |
| . | . | ... | . | . | ... | . | . | ... | ... |
| . | . | ... | . | . | ... | . | . | ... | ... |
| . | . | ... | . | . | ... | . | . | ... | ... |

PASSWORD GENERATION AND VERIFICATION SYSTEM AND METHOD THEREFOR

CROSS-REFERENCE TO RELATED APPLICATION

This application claims priority to Japanese Patent Application No. 2000-391720, filed 25 Dec. 2000.

FIELD OF THE INVENTION

The present invention relates to systems and methods for verifying a password, and more specifically to a system and method for selecting and verifying elements that comprise a password on an element-by-element basis.

BACKGROUND OF THE INVENTION

For access to computer systems and specific programs, activation of electronic devices, unlocking of doors, and so forth, a password is used to ensure security, so that only an owner of such security authorization can access the computer system, for example. The password typically comprises a combination of multiple alphabets and numerals. The user of the computer system registers his predetermined password with the system and enters that password whenever he accesses the system. The system compares the entered password against the registered password, and, if they match, grants him access to the system.

In order to prevent unauthorized access effectively, a password should preferably be alphanumeric characters consisting of a complex combination of alphabets and numerals. However, because it is difficult to accurately remember complicated alphanumeric characters for a long period of time, a password comprising a easy-to-remember combination of alphanumeric characters, for example, a password including the name and/or birth date of the user, is chosen. Such a password is readily deciphered by an unauthorized intruder so that it is easily allowed to gain access to the system.

In order to overcome such shortcomings, it is recommended not to use passwords that contain meaningful words, including, for example, common nouns, people's names, geographical names, and country names; additionally, security for passwords is enhanced by, for example, periodically changing the password. Such solutions inevitably result in reduced usability of passwords, so that an easy-to-remember password is eventually preferred. In other words, when security for a password is enhanced, its usability is degraded, whereas when its usability is improved, its security is lowered.

Furthermore, as social life diversifies into various activities, the opportunity for using passwords will increase. Passwords are demanded in many cases, for example, when a bank account is accessed from the ATM (Automatic Teller Machine), when the computer is started up, and when an online transaction is performed over the Internet. It is quite difficult to remember and manage a plurality of those passwords. As a result, there may be scenarios where you may forget or misremember your password so that you cannot withdraw cash, or you may fail to boot your computer so that you cannot perform business smoothly. Because of such inconvenience, the password user employs a single password for multiple systems, or write down multiple passwords on his notepad, for example. Such procedures compromise system security that would otherwise be provided by setting up passwords.

Furthermore, maintaining and using as appropriate complicated passwords for each purpose would be very burdensome for elderly people, and thus impractical. As the society becomes more and more information-rich with a greater aging population, password control and input will become a significant burden for the elders.

Accordingly, it is an objective of the present invention to provide an improved password generation and verification system and a method therefore.

It is also an objective of the present invention to provide a password generation and verification system that facilitates password control and input, and a method therefore.

SUMMARY OF THE INVENTION

In order to achieve the above objectives, according to the present invention, a plurality of different categories are first selected and an element group comprised of a single or multiple password elements that belong to each category is stored in an element group storage means. When used, a specific number of categories that are randomly preset from the plurality of categories are selected. Next, a sampled password element that belongs to each of those categories is sampled from the element group storage means (if multiple password elements are provided for a single category, one of them is randomly sampled). Next, a predefined number of scramble elements that belong to the same category are randomly sampled from the scramble element storage means. The sampled scramble elements are mixed with the sampled password element, and a mixed element group, where those elements are arranged in random order, is subsequently generated on a category by category basis. The resulting mixed element group is displayed on a display means. From the group displayed, a selected password element is chosen according to the category, and correlated, on a category by category basis, by verifying means against the sampled password element stored in the password storage means. As a result of the verification, if all of the selected password elements match each of the sampled password elements, a match signal is outputted.

The present invention that provides a method for verifying a password comprises the steps of: selecting from a plurality of preset categories a category to be displayed; randomly selecting a sampled password element that belongs to that category and a scramble element, different from the sampled password element, that belongs to the same category; mixing the two elements before generating, according to the category, a mixed element group where they are arranged in random order; displaying the element group; selecting, according to the category, a selected password element from the element group displayed; and verifying the selected password element to the sampled password element according to the same category.

DETAILED DESCRIPTION OF THE PREFERRED EMBODIMENT

A password generation and verification system according to the present invention offers the capabilities of generating target categories, generating a password, and verifying the password. With reference to the present invention in general, and more specifically to the capability of generating categories, a category where password elements are classified is preset by the user; the more categories, the more preferable in terms of security. They include, for example, the name of the user's acquaintance, his birthplace, alma mater (elementary school, junior high school, high school, university, etc.), name of the division to which he was first assigned in the company, name of the city where he lived in the past, name of the foreign country he visited, his habit, and so forth. They are stored in the system.

Next, with reference to the capability of generating a password, the password includes a plurality of password elements that are randomly sampled whenever it is used, and each of the password elements is preset by the user on a category by category basis. The password elements that are set are stored in the password generation and verification system.

Further, with reference to the capability of verifying the password, the system generates a mixed element group where randomly sampled scramble elements are added to a sampled password element that is arbitrarily sampled according to the category selected by the system (there may be a password element that is singularly determined at all times when a category, such as birthplace, is selected, or a plurality of password elements, such as the user's acquaintances; in the latter case, one of them is randomly sampled by the system). The mixed element group includes the sampled password element that was preset by the password user and has been sampled by the system as described above, and a plurality of scramble elements sampled by the system. The password user chooses a selected password element that is selected by the user from the mixed element group displayed on a display device. One selected password element is chosen from each element group, and when all the selected password elements are chosen as appropriate, the system correlates the sampled password element and the selected password element on a category by category basis. As a result, if all of the selected password elements match the sampled password elements, the system decides that the person who entered the password is an authorized user.

Typically, password elements are often represented by a character string, but may be specific image information or audio information. In the case of image information, for example, images stored in a predetermined format are stored as password elements into the system. The system may provide images as scramble elements and permit password elements to be selected on the display device. If image information is used as password elements, images that are familiar to the user are remembered for a long period of time, and thus suitable for storage and control of the password. In this way, various types of password elements may be used, though the implementation of the present invention is described in greater detail with reference to the drawings, in a case where a password element is a character string.

Figure 1:
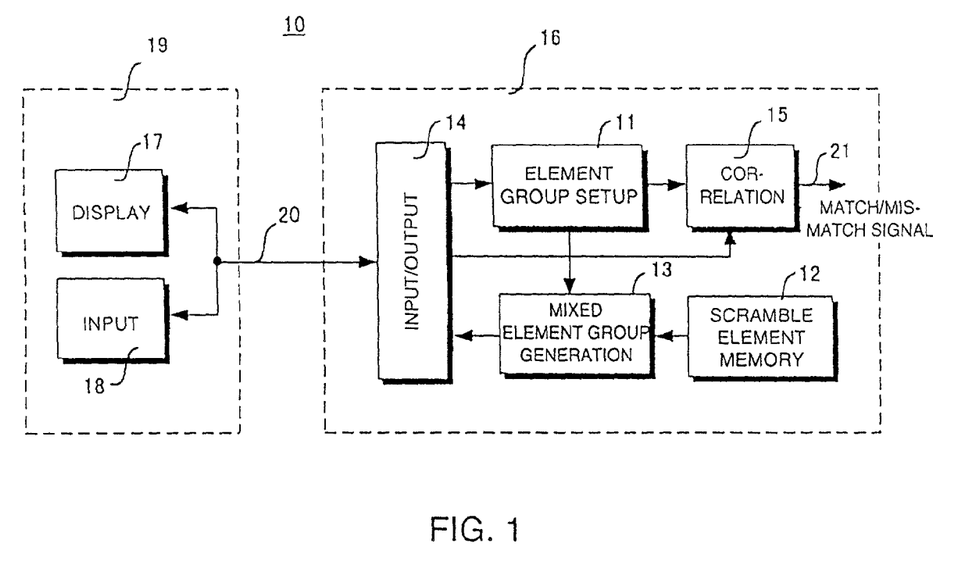
FIG. 1 shows a block schematic diagram of a password generation and verification system according to the present invention.

FIG. 1 shows a password generation and verification system 10 according to the present invention, which comprises: a password generation and verification unit 16 including an element group setup portion 11, a scramble element memory 12, a mixed element group generating portion 13, an input/output portion 14, and a comparator portion 15; and a password setup input terminal 19 including a display device 17 and an input device 18, The password generation and verification unit 16 is coupled to the password setup input terminal 19 via a wireline or wireless connection line 20.

First, how an element group is generated is described. A password according to the present invention is randomly set whenever it is used, and is made up of a plurality of password elements that are sampled according to the category. Each password element is arbitrarily preset by the password user and stored in the element group setup portion 11 of the system 10. The process of generating an element group is described with reference to the flowchart of FIG. 2.

Figure 2:
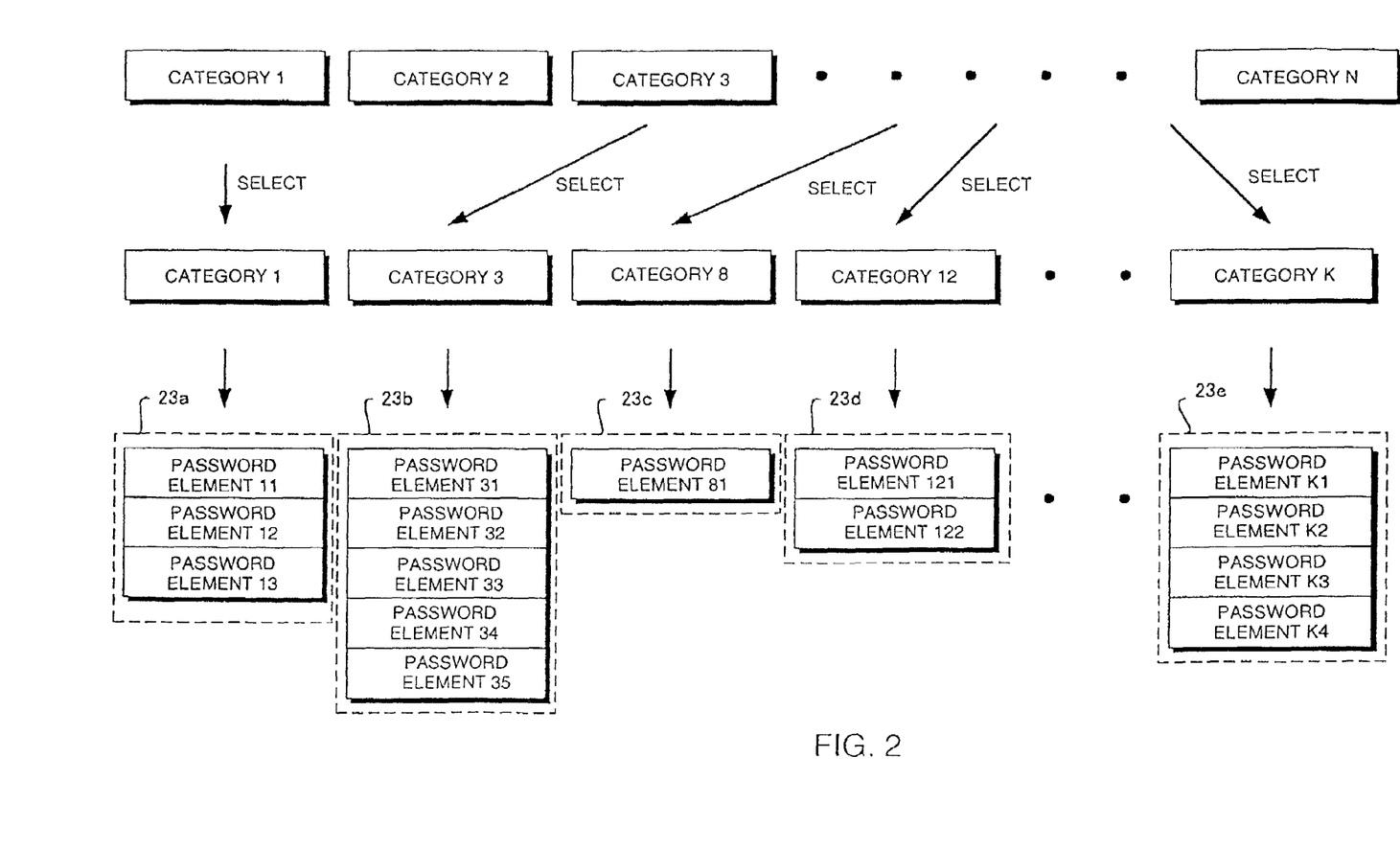
FIG. 2 is a flowchart for explaining the procedures for generating an element group according to the present invention.

The system 10 makes available beforehand various categories 1, 2, 3, . . . , N, including, for example, name of the user's acquaintance, his birthplace, alma mater (elementary school, junior high school, high school, university, etc.), name of the division to which he was first assigned in the company, name of the city where he lived in the past, name of the foreign country he visited, his habit, and so forth, and the user of this system selects desired categories as many as possible among them. For example, categories 1, 3, 8, 12, . . . , and K are selected. When the categories are selected, the user enters familiar names to those categories. For example, if category 1 is the names of acquaintances, which include Tatsuo Maekawa, Taro Yamada, and Shiro Ono, then these names are entered in password elements 11, 12, and 13. These password elements 11, 12, and 13 are stored as a element group 23a into the element group setup 11. By performing similar procedures for categories 3, 8, 12, . . . , K, password elements for the respective categories are entered. It should be appreciated that if category 8 is the birthplace, the user's birthplace is singular; thus, a single password element 81 is provided. In this way, once password elements are entered for all the categories 1, 3, 8, 12, . . . , K selected by the user, they are stored into the element group setup 11 as element groups 23a, 23b, 23c, 23d, and 23e. Of these password elements stored, a sampled password element is randomly sampled by the mixed element group 13 according to each category, as described below.

Figure 3:
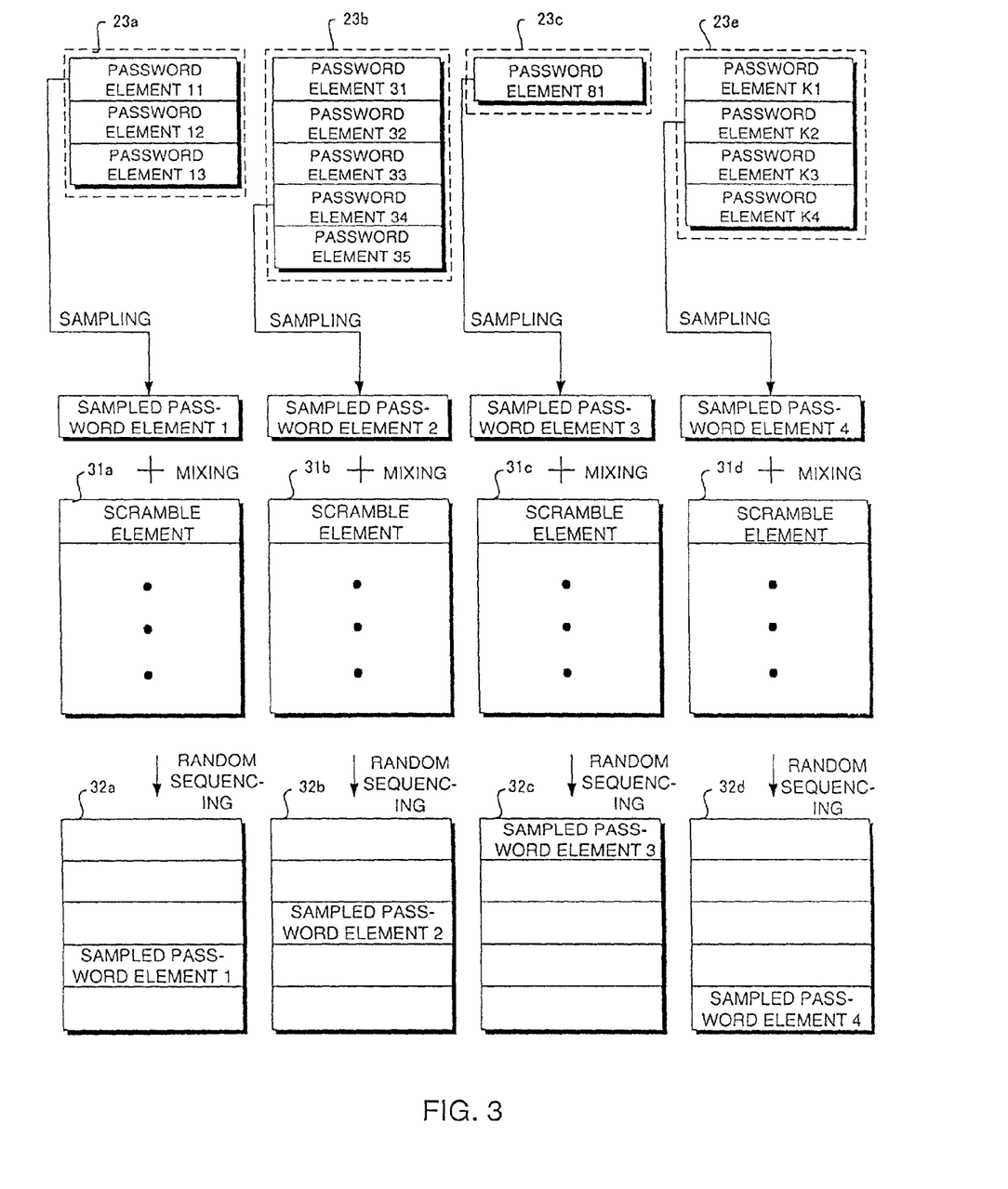
FIG. 3 is a flowchart for explaining the procedures for generating a mixed element group according to the present invention.

Next, the capability of verifying the password is described. FIG. 3 is a flowchart for explaining the procedures for generating a mixed element group in the mixed element group generating portion of the system 10. As described above, the element groups 23a, 23b, 23c, 23d, and 23e generated by the user of the system 10 have already been stored in the element group setup 11. When the user provides a password to the system 10 to attempt to obtain authentication, the system 10 asks the user a category inquiry number. The category inquiry number is a number that determines on how many categories password elements are asked to the user. Assuming here that "4" is given, then the system 10 randomly specifies, for example, element groups 23a, 23b, 23c, and 23e from the element groups 23a, 23b, 23c, 23d, and 23e. The element groups that belong to those specified categories differ whenever the user attempts to gain authentication for the system 10. Once the element groups are specified, the mixed element group generating portion 13 randomly samples one of the password elements contained in each element group, and thus extracts sampled password elements 1, 2, 3, and 4.

Once the sampled password elements 1, 2, 3, and 4 are sampled, a predefined number of scramble elements 31a, 31b, 31c, and 31d that belong to the same category as the sampled password elements, as stored in the scramble element memory 12, are selected according to the category, and mixed with the sampled password elements 1, 2, 3, and 4, respectively. Once the sampled password elements 1, 2, 3, and 4 are mixed with the scramble elements 31a, 31b, 31c, and 31d, they are randomly rearranged, so that mixed element groups 32a, 32b, 32c, and 32d are generated for presentation on the display device 17. The user selects as a selected password element an element that is most familiar to him among the mixed element groups presented on the display device 17. When the selected password element for each category is entered, the system 10 performs verification with the sampled password element on a category by category basis. If all are matched, the system 10 generates a match signal and gives authentication to the user.

The above process is further described with reference to the block diagram 10 shown in FIG. 1. First, setting of element groups is described. Password elements are provided by the password user via the input device 18. Initially, the number of categories for entering the password elements is inquired from the password generation and verification unit 16, and password elements are entered for each of the categories corresponding to that number. Alternatively, a list of categories made available by the system may be displayed on the display device 17 to permit the user to select them. Element groups may also be selected via a dedicated terminal unit, which is especially needed in banks and so forth where a high level of password security is demanded. Password elements are set as classified on a category by category basis; for example, "7" is entered as the number of categories, so that the name of acquaintance, birthplace, alma mater, name of division to which the user was first assigned in the company, name of the city where he lived in the past, name of the foreign country he visited, and habit are selected as categories. For example, when password elements in the name of acquaintance category are set, Tatsuo Maekawa, Taro Yamada, and Shiro Ono are set as the names of acquaintances. If the user lived in Hakodate, Tucson, Yamagata, and Lyon, then Hakodate, Tucson, Yamagata, and Lyon are entered as the names of the cities he lived in the past. In this way, the names most familiar to the user for each category are set, according to the category, as password elements into the element group setup 11 from the input device 18 via the connection line 20.

Figure 4:
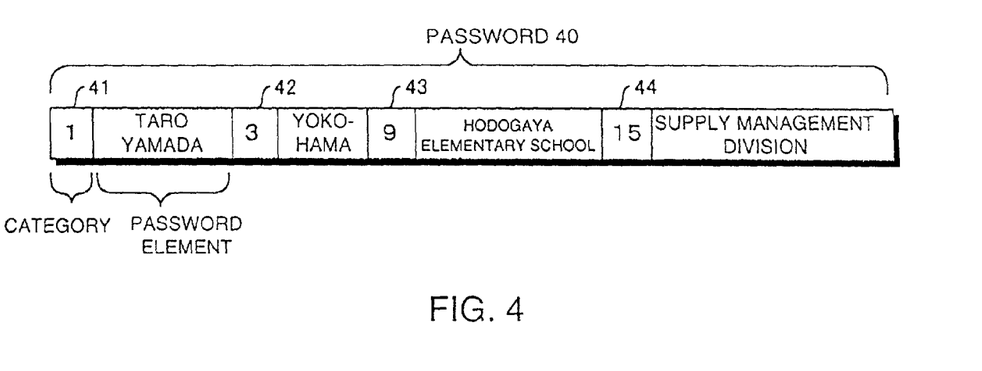
FIG. 4 is a diagram for explaining the concept of a password according to the present invention.

A password according to the present invention is made up of multiple password elements, but each password element is sampled from among the preset element groups as described above. FIG. 4 conceptually depicts the structure of a password 40 sampled as described above, where the password elements sampled and their respective assigned category numbers 41, 42, 43, and 44 are stored in pair into the element group setup portion 11. The category numbers are used when selecting scramble elements described below. It should be noted that a combination of password elements that comprise the password 40 differs whenever the user attempts to gain authentication for the system 10.

Next, entering and verifying the password is described. The mixed group generating portion 13 of the system 10 asks a category inquiry number to the user who enters the password. For example, if a category number "4" is entered from the input device 18, the mixed element group generator 13 randomly selects four categories from the preset categories of element groups. For example, the name of acquaintance, birthplace, name of elementary school, and name of division categories are selected, and sampled password elements are randomly sampled from the password elements that have been set for each category. The fixed element group generator 13 extracts from the scramble element memory 12 a plurality of scramble elements that belong to the same category as the sampled password element, and mixes them with the sampled password element to generate a mixed element group where they are arranged in random order. For example, the mixed group generator 13 extracts a sampled password element, "Taro Yamada", from the element group setup portion 11. As shown in FIG. 4, the category number "1" is assigned to "Taro Yamada"; thus, when the element group generator 13 recognizes that "Taro Yamada" is the name of acquaintance, a predetermined number of names, for example, "Shiro Saito", "Hajime Ogawa", "Yoshihiko Ichikawa", "Toru Kato" are randomly chosen as scramble elements from the names stored in the scramble element memory 12. The scramble elements chosen are missed with the password element and rearranged in random order to generate a mixed element group. In this way, the mixed element group generated for each category is sent to the display device 16.

Figure 5:
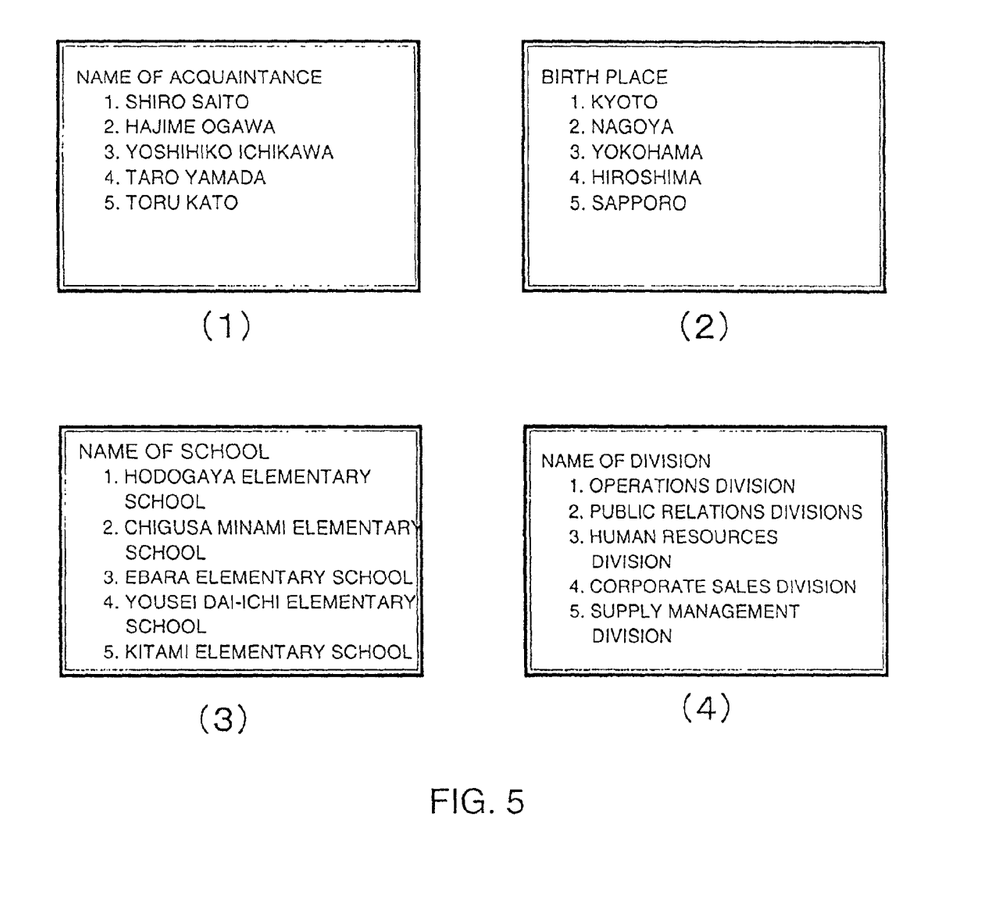
FIG. 5 is a diagram illustrating an example of how element groups are displayed on a display device.

FIGS. 5 (1)–(4) show examples of mixed element groups according to the category, i.e., "name of acquaintance", "birthplace", "name of elementary school", and "name of division", presented on the display device 16. Referring to the mixed element groups displayed on the display device 16, the password user selects a certain password element and enters its number from the input device 17. In the name of acquaintance category, for example, the password user enters number "4" as the selected password element "Taro Yamada", because his pre-selected password element is "Taro Yamada". Then, "Yokohama" is selected as the selected password element in the birthplace category as shown in FIG. 5 (2); "Hodogaya Elementary School" in the name of school category; and "Supply Management Division" in the name of division category. These selected password elements are sent via the connection line 20 to the correlator 15, where they are compared with the sampled password elements stored in the element group setup portion 11, respectively. As a result of the comparison, if the sampled password elements match all of the selected password elements, a match/mismatch signal 21 is outputted externally. This signal is sent to another unit that utilizes the result of password verification.

Figure 6:
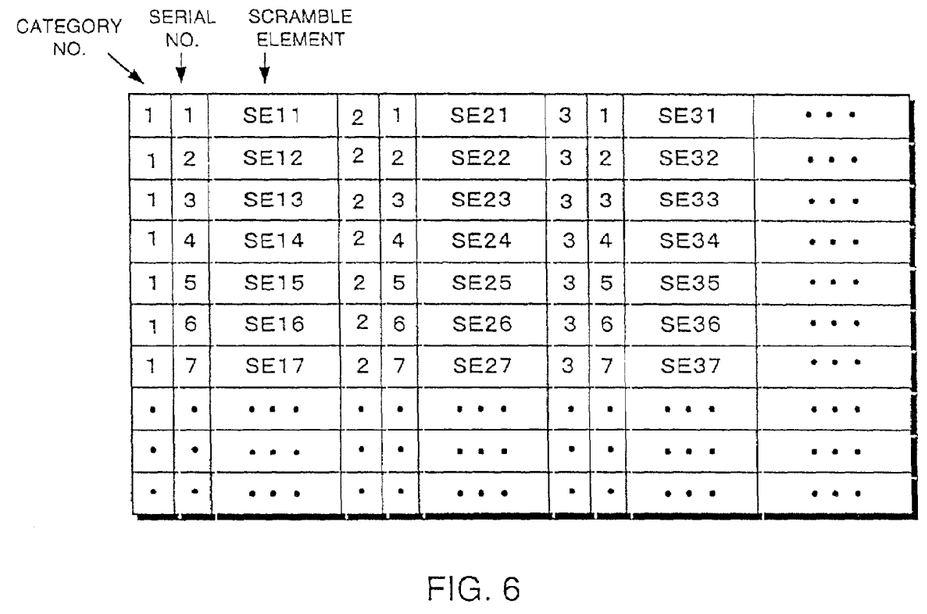
FIG. 6 is a diagram illustrating scramble elements stored in a scramble element memory on a category by category basis.

Referring next to FIG. 6, scramble elements stored in the scramble element memory 12 according to the category are shown. As described above, because a predetermined number of scramble elements are randomly sampled when a mixed element group is generated, as many scramble elements as possible are provided beforehand as potential candidates, on a category by category basis. More specifically, a category number and a serial number are assigned to a single scramble element, which are stored in the memory 12. The category represents a word having the same meaning, such as name and birthplace, while the serial number denotes a continuous number used when randomly selecting a scramble element. Words that belong to category 1 are arranged in order of scramble elements, SE11, . . . , SE17, and so on; words that belong to category 2 are arranged in order of scramble elements, SE21, . . . , SE27, and so on. For example, when a scramble element of category 1 is sampled, if "5" is generated by random-number generation, then scramble element, SE15, corresponding to that number is chosen. A predetermined number of scramble elements chosen in this way are sent to the element group generator portion 13. A similar process is also performed for categories 2 and 3.

Figure 7:
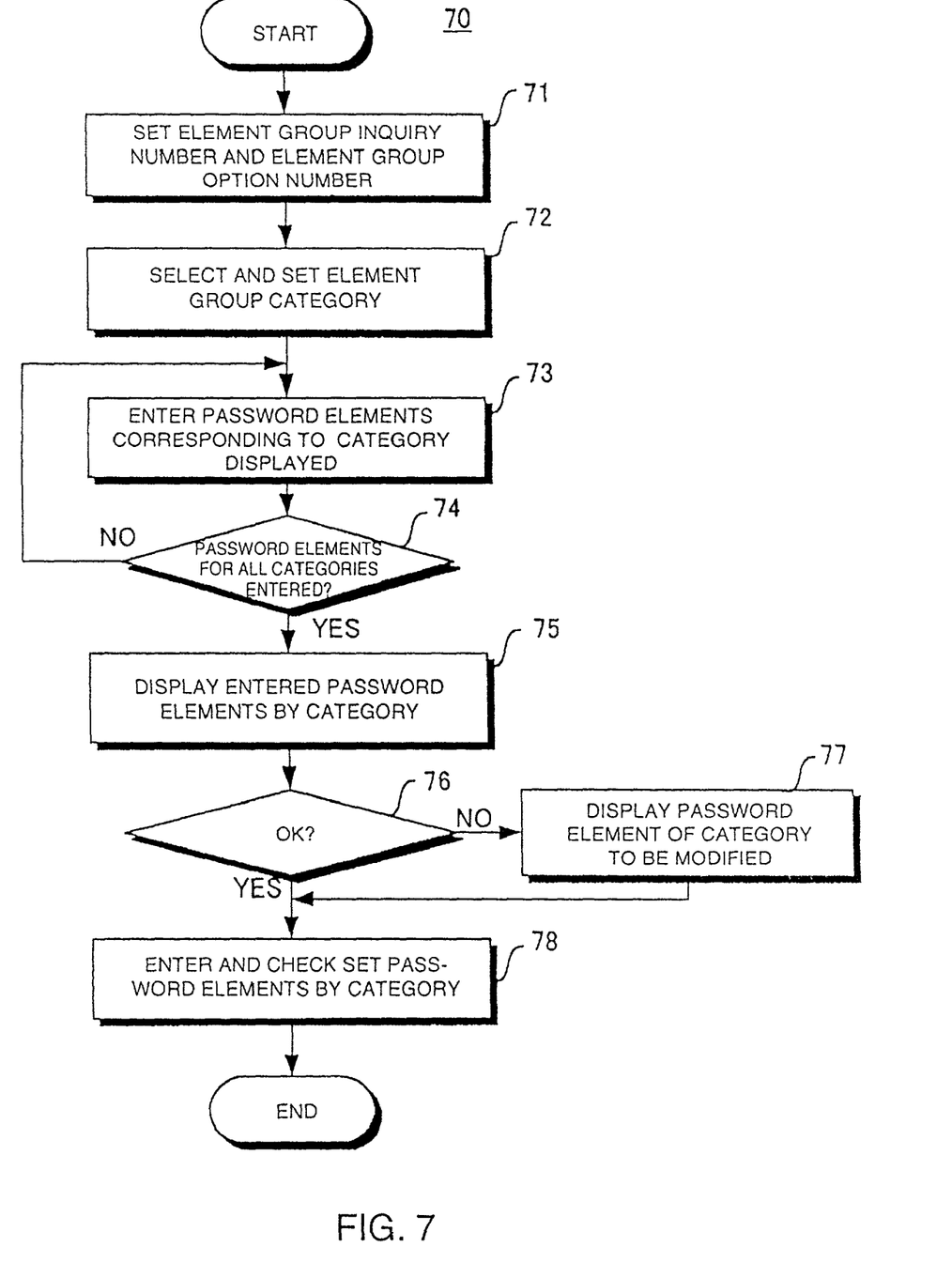
FIG. 7 is a flowchart illustrating the procedures for generating a password element according to the present invention.

Next, the procedures for how a password element is set by the password user in the password generation and verification system are described in accordance with the flowchart 70 shown in FIG. 7. When the password generation and verification system 10 enters the password element generation mode, it firsts sets the element group inquiry number and element group option number, at block 71. The element group inquiry number, which is a number of categories used for inquiry among a plurality of categories available, is "4" in the above example, while the element group option number is "5", as shown in FIG. 5. In this embodiment, the element group number and element group option number are queried at block 71, although the system may have their default (or preset) values. Once the element group number and element group option number are set, an element group category(s) is selected, at block 72. The password user may select desired category(s) within the range of the element group number selected at block 71. For this selection, the system may list prearranged categories on the display device 16 to allow the password user to choose from the categories listed. In the above example, "name of acquaintance", "birthplace", "name of elementary school" and "name of division" are selected.

Once the desired categories are set, the process proceeds to block 73, where a password element(s) for each category is entered. For example, in the "name of acquaintance" category, multiple names, in addition to "Taro Yamada", are entered. At block 74, it is determined whether password elements have been entered for all of the categories. If not, the process returns to block 73, where a similar process as described above is performed. If password elements have been entered for all of the categories, the process proceeds to block 75.

At block 75, the display device 16 displays all the password elements by category, and if there is any password element to be modified, the password user modifies the password element at block 77. When all of the password elements displayed are acceptable at block 76, or when modification of password elements is completed at block 77, the process proceeds to block 78, where the password user enters the re-set password elements by category, and checks if the input of the password user is accurate. When this check is completed, the password generation and verification unit 15 completes the password input and setup.

Figure 8:
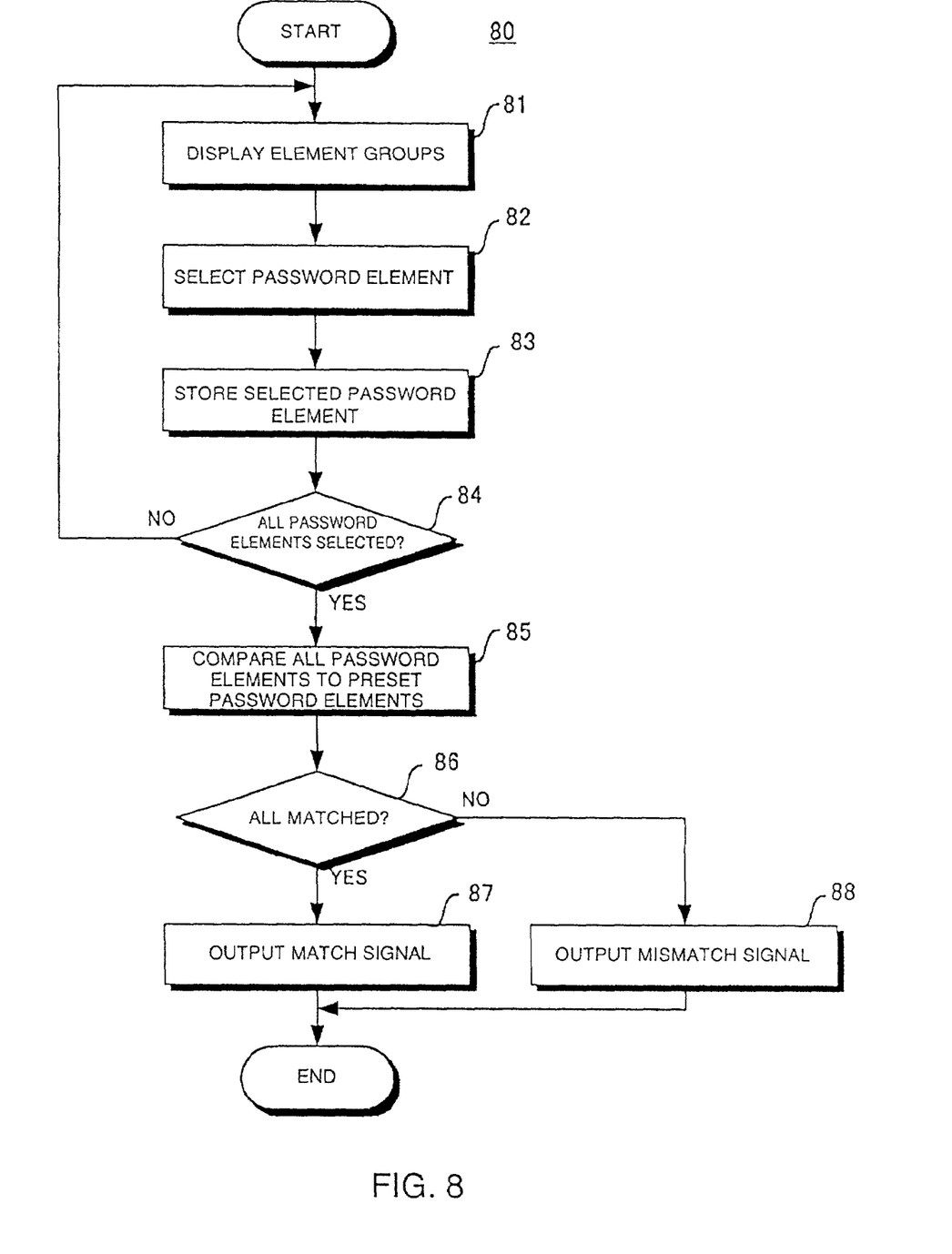
FIG. 8 is a flowchart illustrating the procedures for verifying the password according to the present invention.

Next, the procedures for verifying the password are described in accordance with the flowchart 80 shown in FIG. 8. First, when the verification system 10 is activated and enters the verification mode, the element groups, as shown in FIG. 4, are displayed by category on the display device 16, at block 81. Proceeding to block 82, the password user enters a desired number from the items presented via the display device 16, using a keypad of the input device 17. For example, in the name of acquaintance category, if it is judged that "Taro Yamada" is the selected password element of this category, then "4" is pressed on the keypad. Alternatively, the cursor may be scrolled to select its relevant position. Once the selected password element is entered, that selected password element is stored in the memory, at block 83. Proceeding to block 84, it is determined whether all of the selected password elements have been entered; if not, the process proceeds to block 81, where a similar process is performed as described above.

At block 84, once all of the selected password elements have been entered, the process proceeds to block 85, where the pre-sampled password elements and the selected password elements entered are correlated each other. If all of the selected password elements match the sampled password elements, a match signal is outputted at step 87; if at least one of the selected password elements does not match the sampled password elements, a mismatch signal is outputted.

As described above, the selected password elements entered from the password input terminal 18 are compared against the preset sampled password elements, and if they match all of the sampled password elements, authentication can be provided to the password user.

It should be appreciated that in the procedures shown in FIG. 7, after all of the selected password elements have been entered, verification with the pre-sampled password elements is initiated; however, as each of the selected password element is entered, it may be compared with the sampled password elements. In that case, at a time when a mismatching selected password element is entered, the verification mode may be terminated to provide a notification to the person who entered the selected password that a password input error occurred. It should also be appreciated that a mismatch signal is outputted at block 88, although this process is not especially needed, but only a match signal at block 87 may be outputted externally.

Figure 9:
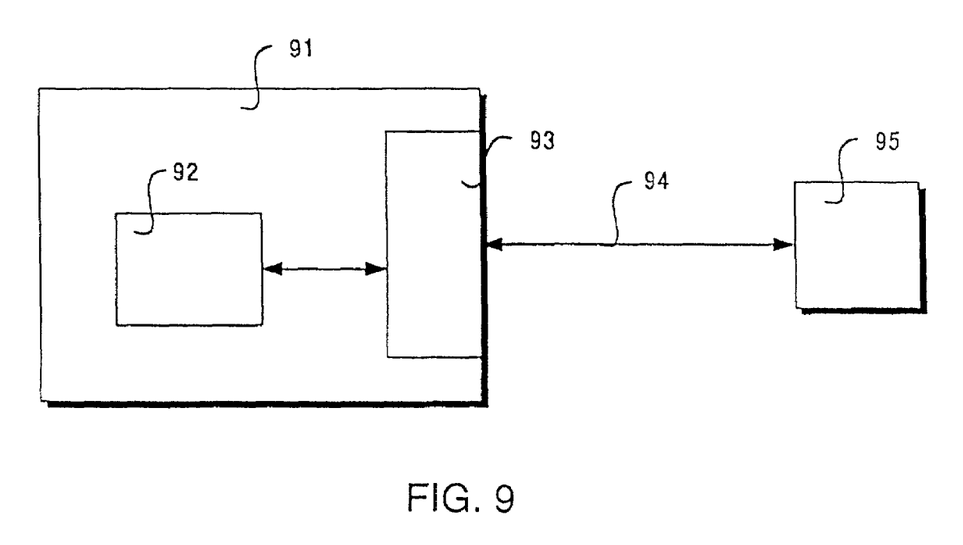
FIG. 9 shows a block schematic diagram illustrating one embodiment that utilizes the password generation and verification system according to the present invention.

The password generation and verification system according to the present invention may be applicable to various apparatuses and systems, thereby improving the security for those apparatuses and systems. FIG. 9 shows a block schematic diagram where a password generation and verification system 93 according to the present invention is applied to a computer system 92 installed in a bank 91. The computer system 92, which processes banking transactions, is typically coupled to a terminal equipment 95 installed at a remote site via a wireline or wireless line 94, including private or public lines. The terminal equipment 95 is often an automatic teller machine (ATM), but may also be a home computer terminal connected to a fixed or cellular telephone, due to recent proliferation of the Internet or i-mode service offered by NTT of Japan. When an access is made from the terminal equipment 95 to the computer system 92, the password generation and verification system 93 correlates to determine whether the password sent from the terminal equipment 95 matches the preset password. According to the present invention, it is determined whether the all of the selected password elements sent from the terminal equipment 95 match the password elements stored in the computer system 92. If all match, the computer system 92 provides authentication to the person who operates the terminal equipment 95 as an authorized person. This authentication allows the terminal equipment 95 to be coupled to the computer system 92, so that various transactions may be instructed.

In the above embodiment, the present invention is applied to improve the security for the computer system in the bank, although it may also be applicable to any computer system of public organizations that requires authentication of whether a persona who operates the terminal equipment is authorized or not.

In cases where a remote access is made to a corporate or home computer via a wireline or wireless line, the present invention may also be applied to improve system security. Especially, a connection may be established with a corporate or home computer from a remote office or hotel room during a business trip, so that necessary information may be sent and/or received at relatively low cost.

Furthermore, for management of limited-access areas, such as, for example, houses, vaults, factory plants, research laboratories, and military facilities, the present invention may also be applied to computers that control locking and unlocking of their gateways.

Only authorized persons may sometimes be allowed to operate specific vehicles, machines, and apparatuses (including automobiles, construction machineries, farming machineries, and factory machineries). In such cases, the present invention may be employed as an activation key to such machineries to verify the identity of such persons.

In summary, the present invention may be basically employed in circumstances where password-based identification is required. In particular, a plurality of password elements are used and each password element may be selected based on familiar numerals and words, or image and audio information; thus, unlike prior art methods, the present invention eliminates the need for bothering to remember unfamiliar passwords at all times.

On the other hand, sampling of categories and sampling of correct password elements and, additionally, scramble elements are performed at random by the system (although some of the password elements, such as, for example, "birthplace", are singularly determined at a time when a category is established). This results in a very high level of randomness and thus very low predictability. In other words, the resulting password is very dynamic, as compared to typical static passwords that are fixed for a certain period of time. Accordingly, by employing a method whereby a certain limitation is imposed on response time and verification is denied if there is no input beyond that limitation, even if the whole preset categories and password elements were leaked to any third party, it would be extremely difficult for that third party to provide correct answers as quickly as the authorized person himself, and thus a high level of security is ensured.

What is claimed is:

1. A password generation and verification system, comprising:
    element group storage means for storing a plurality of element groups that are pre-selected from a plurality of different categories, wherein each element group belongs to a selected category and includes a plurality of password elements input by a user that belong to the selected category;
    scramble element storage means for pre-storing a plurality of scramble elements;
    category sampling means for randomly sampling a predetermined number of specific categories from said selected category;
    mixed element group generating means for mixing a sampled password element that is randomly sampled from the plurality of password elements stored in said element group belonging to said specific categories with a predetermined plurality of sampled scramble elements, different than said sampled password element, that are randomly sampled from the plurality of scramble elements stored in said scramble element storage means and belonging to the same category as said sampled password element to generate a mixed element group for each specific category, each mixed element group arranging said sampled password element and said sampled scramble elements in random order;
    display means for displaying said mixed element group including only said sampled password element and said sampled scramble elements;
    selecting means for selecting, from said mixed element group displayed by said display means, a selected password element for each specific category;
    verifying means for verifying said selected password element to said sampled password element for each specific category; and
    authentication means for providing authentication when all of said selected password elements match said sampled password elements.

2. A password generation and verification system according to claim 1, wherein said element group is stored, with said password element associated with said specific category, in said element group storage means.

3. A password generation and verification system according to claim 1, wherein said password element includes image information.

4. A password generation and verification system according to claim 1, wherein said mixed element group generating means is coupled via a telecommunication line to said display means and said selecting means.

5. A password generation and verification system according to claim 4, wherein said telecommunication line includes lines for utilizing a fixed telephone, cellular telephone, and the Internet.

6. A password generation and verification system according to claim 1, wherein said selected password element is not verified to said sampled password element when said selected password element is not selected within a predetermined time.

7. A method for verifying a password, comprising the steps of:
    randomly specifying, from a plurality of element groups that belong to a category that is pre-selected from a plurality of different categories, a predetermined number of said element groups, wherein each element group includes a plurality of password elements that belong to the category;
    mixing a sampled password element that is randomly sampled from one of said specified element groups with sampled scramble elements, different than said sampled password element, that belong to the same category as said sampled password element to generate a mixed element group for each specified element group, where said sampled password element and said sampled scramble element are arranged in random order;
    displaying said mixed element group including only said sampled password element and said sampled scramble elements;
    selecting, from said displayed element group, a selected password element for each mixed element group;
    verifying said selected password element to said sampled password element for each category; and
    providing authentication when all of said selected password elements match said sampled password elements.

8. A method for verifying a password according to claim 7, wherein said step of generating further comprising the step of sending said mixed element group onto a display device that is electrically coupled via a telecommunication line for utilizing a fixed telephone, cellular telephone, and the Internet, and receiving said selected password element via said telecommunication line.

9. A method for verifying a password according to claim 7, wherein said step of verifying said selected password element to said sampled password element is denied when said selected password element is not selected within a predetermined time.

* * * * *

UNITED STATES PATENT AND TRADEMARK OFFICE
CERTIFICATE OF CORRECTION

PATENT NO. : 7,065,786 B2 Page 1 of 1
APPLICATION NO. : 09/09909383
DATED : June 20, 2006
INVENTOR(S) : Jun Yajima et al.

It is certified that error appears in the above-identified patent and that said Letters Patent is hereby corrected as shown below:

TITLE PAGE, Column 2 (Other Publications), Line 16, change "1985pp." to --1985, pp.--

Signed and Sealed this

Seventh Day of November, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,065,786 B2 | Page 1 of 1 |
| APPLICATION NO. | : 09/909383 | |
| DATED | : June 20, 2006 | |
| INVENTOR(S) | : Akira Taguchi | |

It is certified that error appears in the above-identified patent and that said Letters Patent is hereby corrected as shown below:

This certificate supersedes Certificate of Correction issued November 7, 2006, should be vacated since no Certificate of Correction was granted for this patent number.

Signed and Sealed this

Twelfth Day of December, 2006

JON W. DUDAS
*Director of the United States Patent and Trademark Office*